US009376558B2

(12) United States Patent
Price et al.

(10) Patent No.: US 9,376,558 B2
(45) Date of Patent: Jun. 28, 2016

(54) POLYMER COMPOSITIONS, ARTICLES MADE FROM SUCH COMPOSITONS, AND METHODS FOR MOLDING SUCH COMPOSITIONS

(75) Inventors: John D. Price, Moore, SC (US); Nathan A. Mehl, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 507 days.

(21) Appl. No.: 12/787,598

(22) Filed: May 26, 2010

(65) Prior Publication Data

US 2010/0301525 A1 Dec. 2, 2010

Related U.S. Application Data

(60) Provisional application No. 61/182,671, filed on May 29, 2009.

(51) Int. Cl.
```
C08L 23/10      (2006.01)
B29C 49/00      (2006.01)
B29C 49/04      (2006.01)
B29K 23/00      (2006.01)
B29L 31/00      (2006.01)
C08K 5/00       (2006.01)
C08L 27/12      (2006.01)
```

(52) U.S. Cl.
CPC ............. *C08L 23/10* (2013.01); *B29C 49/0005* (2013.01); *B29C 49/04* (2013.01); *B29K 2023/12* (2013.01); *B29L 2031/7158* (2013.01); *C08K 5/0083* (2013.01); *C08L 27/12* (2013.01)

(58) Field of Classification Search
CPC ............................ C08L 23/10; C08L 2666/04
USPC ......................................................... 264/540
See application file for complete search history.

(56) References Cited

U.S. PATENT DOCUMENTS

| | | | |
|---|---|---|---|
| 3,125,547 A | 3/1964 | Blatz | |
| 4,829,116 A | 5/1989 | Piesold | |
| 5,614,319 A | 3/1997 | Wessels et al. | |
| 5,707,569 A | 1/1998 | Priester et al. | |
| 5,804,654 A | 9/1998 | Lo et al. | |
| 6,040,370 A | 3/2000 | Wozny et al. | |
| 6,384,123 B1 | 5/2002 | Young | |
| 6,547,094 B1 | 4/2003 | Jacobs | |
| 7,001,951 B2 | 2/2006 | Chapman, Jr. et al. | |
| 7,157,510 B2 | 1/2007 | Xie et al. | |
| 7,420,010 B2 | 9/2008 | Sukhadia et al. | |
| 2004/0014861 A1 | 1/2004 | Hatzikiriakos et al. | |
| 2004/0156106 A1 | 8/2004 | Allen et al. | |
| 2004/0254268 A1* | 12/2004 | Cernohous et al. | 524/9 |
| 2006/0173108 A1 | 8/2006 | Xu et al. | |
| 2006/0287430 A1 | 12/2006 | Amos et al. | |
| 2008/0139718 A1 | 6/2008 | Reyntjens et al. | |
| 2010/0260995 A1* | 10/2010 | Pellegatti et al. | 428/220 |

FOREIGN PATENT DOCUMENTS

| | | |
|---|---|---|
| EP | 0 385 199 A2 | 2/1990 |
| EP | 0 524 404 A1 | 5/1992 |
| JP | 08-239525 | 9/1996 |
| WO | WO 95/21887 | 8/1995 |
| WO | WO 00/69967 | 11/2000 |
| WO | WO 01/34690 A1 | 5/2001 |
| WO | WO 02/074859 A1 | 9/2002 |
| WO | WO 2009/077287 A1 | 6/2009 |

OTHER PUBLICATIONS

Duchesne et al., Processing Additives in High Density Polyethylene Extrusion Blow Moulding Applications, Dynamar Polymer Processing Additives, Dyneon a 3M Company pp. 1-15, No. 11, USA 98-0504-1066-5 presented at the Society of Plastics Engineers Antec '93 Conference, New Orleans, LA May 10-13, 1993.
Dynamar Polymer Processing Additive FX 5911 to Improve the HDPE Blow Molding Process Brochure, 2 pages, Dyneon a 3M Company, USA 98-0504-1579-7.
Dynamar Polymer Processing Additives FX 5911, Technical Information, 2 pages, Dyneon a 3M Company, USA 98-0504-1422-0.

\* cited by examiner

*Primary Examiner* — Larry Thrower
(74) *Attorney, Agent, or Firm* — Robert M. Lanning

(57) ABSTRACT

A polymer composition comprises a thermoplastic polymer, a polymer additive selected from the group consisting of nucleating agents, clarifying agents, and combinations thereof, and a fluoropolymer. A molded article comprises at least one wall defining a cavity, the wall having an opening therein permitting access to the cavity. The wall comprises a polymer composition comprising a thermoplastic polymer, a polymer additive selected from the group consisting of nucleating agents, clarifying agents, and combinations thereof, and a fluoropolymer. A method for molding a polymer composition is also provided.

12 Claims, No Drawings

POLYMER COMPOSITIONS, ARTICLES MADE FROM SUCH COMPOSITONS, AND METHODS FOR MOLDING SUCH COMPOSITIONS

CROSS REFERENCE TO RELATED APPLICATIONS

This application claims, pursuant to 35 U.S.C. §119(e), the benefit of the filing date of U.S. Patent Application No. 61/182,671, which was filed on May 29, 2009, and is hereby incorporated by reference.

TECHNICAL FIELD OF THE INVENTION

This invention relates to polymer compositions, articles made from such polymer compositions, and methods for molding such polymer compositions.

BRIEF SUMMARY OF THE INVENTION

As noted above, the present invention is generally directed to polymer compositions, articles (e.g., molded articles) made from such polymer compositions, and methods for molding such polymer compositions. When used in forming molded articles, such as an extrusion blow molded article, the polymer composition of the invention, which includes a synergistic blend of a polymer additive and a fluoropolymer, is believed to be particularly well-suited for the production of molded articles exhibiting desirable optical properties (e.g., haze and gloss). In particular, molded articles produced using the polymer composition of the invention are believed to exhibit a desirable combination of low haze and high gloss as compared to articles made using other polymer compositions. In view of these optical properties, the polymer composition of the invention and molded articles formed therefrom are believed to be particularly desirable for use in packaging and food containers.

While not wishing to be bound to any particular theory, it is believed that the nucleating or clarifying agent acts to provide the bulk or interior portions of the polymer with desirable optical properties (e.g., low haze), while the fluoropolymer works in concert with the nucleating or clarifying agent to provide a molded article having desirable surface properties, such as high gloss. More specifically, it is believed that the fluoropolymer acts to coat the working surfaces of the machinery used to process the polymer composition and that the polymer composition, when worked over these surfaces, then replicates the relatively smooth surface created by the coating. Furthermore, it is believed that the inclusion of the nucleating agent or clarifying agent reduces the size of the crystals that form as the polymer cools from the plasticized (molten) state and that this smaller crystal size creates less pronounced and smaller disturbances in the polymer surface.

In a first embodiment, the invention provides a polymer composition comprising a thermoplastic polymer, a polymer additive selected from the group consisting of nucleating agents, clarifying agents, and combinations thereof, and a fluoropolymer. In certain possibly preferred embodiments, the polymer additive is a clarifying agent that comprises an acetal compound that is the condensation product of a polyhydric alcohol and an aromatic aldehyde.

In a second embodiment, the invention provides a molded thermoplastic article comprising at least one wall defining a cavity, the wall having an opening therein permitting access to the cavity, the wall comprising a polymer composition comprising a thermoplastic polymer, a polymer additive selected from the group consisting of nucleating agents, clarifying agents, and combinations thereof, and a fluoropolymer.

In a third embodiment, the invention provides a method for molding a polymer composition. The method comprises the steps of providing an apparatus comprising a die and a mold cavity, providing a polymer composition, heating the polymer composition to a temperature sufficient to plasticize (melt) the polymer composition so that it may be extruded through the die of the apparatus, extruding the plasticized (molten) polymer composition through the die to form a parison, capturing the parison in the mold cavity, blowing a pressurized fluid into the parison under sufficient pressure to inflate the parison so that it conforms to the interior surface of the mold cavity and produces a molded article, allowing the molded article to cool to a temperature at which the polymer composition at least partially solidifies so that the molded article retains its shape, and removing the molded article from the mold cavity. The polymer composition comprises a thermoplastic polymer, a polymer additive selected from the group consisting of nucleating agents, clarifying agents, and combinations thereof, and a fluoropolymer. In certain possibly preferred embodiments, the polymer additive is a clarifying agent that comprises an acetal compound that is the condensation product of a polyhydric alcohol and an aromatic aldehyde.

DETAILED DESCRIPTION OF THE INVENTION

In a first embodiment, the invention provides a polymer composition comprising a thermoplastic polymer, a polymer additive selected from the group consisting of nucleating agents, clarifying agents, and combinations thereof, and a fluoropolymer.

The polymer composition can contain any suitable polymer. For example, the polymer composition can contain a thermoplastic polymer, such as a polyolefin. Suitable polyolefins include, but are not limited to, polypropylene homopolymers, polypropylene copolymers (e.g., polypropylene random copolymers), polypropylene impact copolymers, and combinations thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. In certain possibly preferred embodiments, the polymer is a polypropylene random copolymer made from the copolymerization of propylene and ethylene, with the amount of ethylene being from about 1 to about 7 wt. %.

As noted above, the polymer additive is selected from the group consisting of nucleating agents, clarifying agents, and combinations thereof. As utilized herein, the term "nucleating agent" is used to refer to additives that form nuclei or provide sites for the formation and/or growth of crystals in a polymer as it solidifies from a molten state. If present, the nucleating agent in the polymer composition can be any suitable nucleating agent. Suitable nucleating agents include, but are not limited to, 2,2'-methylene-bis-(4,6-di-tert-butylphenyl)phosphate salts (e.g., sodium 2,2'-methylene-bis-(4,6-di-tert-butylphenyl)phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate and calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

If present in the polymer composition, the nucleating agent can be present in any suitable amount. As will be understood by those of ordinary skill in the art, the amount of nucleating agent suitable for use in the polymer composition will depend upon several factors, such as the composition of the nucleating agent and the desired properties of the polymer composition. For example, the nucleating agent can be present in the polymer composition in an amount of about 0.01 wt. % or more, about 0.05 wt. % or more, about 0.075 wt. % or more, or about 0.1 wt. % or more, based on the total weight of the polymer composition. The nucleating agent can be present in the polymer composition in an amount of about 1 wt. % or less, about 0.5 wt. % or less, about 0.4 wt. % or less, or about 0.3 wt. % or less. In certain possibly preferred embodiments, the nucleating agent is present in the polymer composition in an amount of from about 0.01 to about 1 wt. %, about 0.05 to about 0.5 wt. %, about 0.075 to about 0.4 wt. %, or about 0.1 to about 0.3 wt. %, based on the total weight of the polymer composition.

If present in the composition, the clarifying agent can be any suitable clarifying agent. In certain possibly preferred embodiments, the clarifying agent is selected from the group consisting of trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. In certain possibly preferred embodiments, the clarifying agent comprises an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the five remaining positions on the benzene ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively).

In certain possibly preferred embodiments, the clarifying agent comprises an acetal compound conforming to the structure of Formula (I) below:

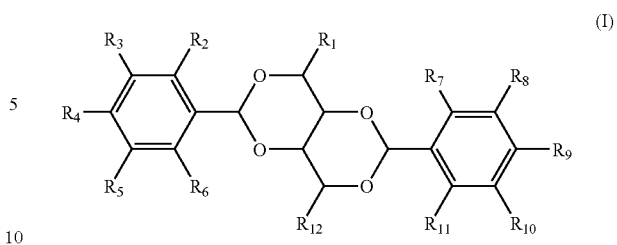

In the structure of Formula (I), $R_1$ is selected from the group consisting of hydrogen, alkyl groups, alkenyl groups, hydroxyalkyl groups, alkoxy groups, and alkyl halide groups. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens. $R_{12}$ is a hydroxyalkyl group selected from the group consisting of —$CH_2OH$ and —$CHOHCH_2OH$. In certain embodiments, $R_1$ is selected from the group consisting of alkyl groups and alkenyl groups; $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are selected from the group consisting of alkyl groups and alkoxy groups. In certain more specific embodiments, $R_1$ is an alkyl group (e.g., n-propyl); $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are each an alkyl group (e.g., n-propyl). In certain other embodiments, $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are each alkyl groups (e.g., methyl groups).

If present in the composition, the clarifying agent can be present in any suitable amount. As will be understood by those of ordinary skill in the art, the amount of clarifying agent suitable for use in the polymer composition will depend upon several factors, such as the composition of the clarifying agent and the desired optical properties of the polymer composition. For example, the clarifying agent can be present in the polymer composition in an amount of about 0.01 wt. % or more, about 0.05 wt. % or more, about 0.075 wt. % or more, or about 0.1 wt. % or more, based on the total weight of the polymer composition. The clarifying agent can be present in the polymer composition in an amount of about 1 wt. % or less, about 0.7 wt. % or less, about 0.6 wt. % or less, or about 0.5 wt. % or less. In certain possibly preferred embodiments, the clarifying agent is present in the polymer composition in an amount of from about 0.01 to about 1 wt. %, about 0.05 to about 0.7 wt. %, about 0.075 to about 0.6 wt. %, or about 0.1 to about 0.5 wt. %, based on the total weight of the polymer composition. Thus, in certain possibly preferred embodiments, such as when the clarifying agent comprises an acetal compound conforming to the structure of Formula (I) in which $R_1$ is an alkyl group (e.g., n-propyl), $R_2$, $R_3$, $R_5$, $R_6$, $R_7$, $R_8$, $R_{10}$, and $R_{11}$ are each hydrogen, $R_{12}$ is —$CHOHCH_2OH$, and $R_4$ and $R_9$ are each an alkyl group (e.g., n-propyl), the clarifying agent can be present in the polymer composition in an amount of from about 0.1 wt. % to about 0.5 wt. % (e.g., about 0.15 wt. % to about 0.45 wt. %). In certain other possibly preferred embodiments, such as when the clarifying agent comprises an acetal compound conforming to the structure of Formula (I) in which $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are each alkyl groups (e.g., methyl groups), the clarifying agent can be present in the polymer composition in an amount of from about 0.1 wt. % to about 0.3 wt. % (e.g., about 0.15 wt. % to about 0.25 wt. %).

The fluoropolymer present in the polymer composition can be any suitable fluoropolymer (e.g., fluoroplastic or fluoroelastomer). Suitable fluoropolymers include, but are not limited to, polymers made from at least one monomer selected from the group consisting of vinylidene fluoride, hexafluoropropylene, chlorotrifluoroethylene, tetrafluoroethylene, perfluoro(alkyl vinyl ether), and combinations thereof. In certain possibly preferred embodiments, the fluoropolymer is a polymer selected from the group consisting of (i) copolymers of vinylidene fluoride and a comonomer selected from the group consisting of hexafluoropropylene, chlorotrifluoroethylene, 1-hydropentafluoropropylene, and 2-hydropentafluoropropylene; (ii) terpolymers of vinylidene fluoride, tetrafluoroethylene, and a comonomer selected from the group consisting hexafluoropropylene, 1-hydropentafluoropropylene, and 2-hydropentafluoropropylene; (iii) copolymers of tetrafluoroethylene and propylene; (iv) copolymers of tetrafluoroethylene, propylene, and vinylidene fluoride; and (v) combinations of two or more of (i)-(iv). In certain more specific possibly preferred embodiments, the fluoropolymer is a terpolymer of vinylidene fluoride, tetrafluoroethylene, and hexafluoropropylene.

The fluoropolymers suitable for use in the polymer composition can have any suitable molecular weight. However, in certain possibly preferred embodiments, the fluoropolymer has a relatively high molecular weight. While not wishing to be bound to any particular theory, it is believed that fluoropolymers having a relatively high molecular weight are particularly well-suited for use in the polymer composition of the invention due, at least in part, to the ability of such fluoropolymers to form and maintain coatings on the working surfaces of the equipment used to process the polymer composition. It is further believed that the coating formed on these working surfaces helps to improve the appearance of a molded article made from the polymer composition (e.g., improve the gloss) by preventing imperfections in these working surfaces from creating imperfections in the surfaces of the molded article or at least reducing the extent of the imperfections formed in the molded article.

As will be understood by those of ordinary skill in the art, the molecular weight of a polymer, including a fluoropolymer such as that used in the polymer composition of the invention, can be measured and expressed in many different ways, though measurements based on correlations between average molecular weight and one or more physical properties of the polymer are commonly used due to the complexity of measuring the molecular weight of the polymer chains in the polymer system. One such measurement is based on the correlation between average molecular weight and the rate of flow of the molten polymer (e.g., melt flow index (MFI)). Another such measurement is based on the correlation between average molecular weight and the shearing torque resisting rotation of a cylindrical metal disk or rotor embedded in the polymer (i.e., Mooney viscosity).

The fluoropolymers suitable for use in the polymer composition can have any suitable melt flow index (MFI). In certain possibly preferred embodiments, the fluoropolymer has an MFI of about 2 g/10 minutes or more, about 3 g/10 minutes or more, about 4 g/10 minutes or more, or about 5 g/10 minutes or more as measured in accordance with ASTM D1238-04c at 265° C. using a 5 kg weight. In certain possibly preferred embodiments, the fluoropolymer has an MFI of from about 2 to about 50 g/10 minutes, or about 3 to about 40 g/10 minutes, or about 4 to about 30 g/10 minutes as measured in accordance with ASTM D1238-04c at 265° C. using a 5 kg weight. In certain possibly more preferred embodiments, the fluoropolymer has an MFI of from about 5 to about 25 g/10 minutes as measured in accordance with ASTM D1238-04c at 265° C. using a 5 kg weight.

The fluoropolymers suitable for use in the polymer composition can have any suitable Mooney viscosity. In certain possibly preferred embodiments, the Mooney viscosity of the fluoropolymer is about 25 or more or about 28 or more, as measured in accordance with ASTM Standard D1646-07 at 121° C., large rotor, condition ML 1+10 minutes. In certain possibly preferred embodiments, the Mooney viscosity of the fluoropolymer is about 80 or less, about 70 or less, about 60 or less, about 50 or less, or about 40 or less (e.g., about 38 or less), as measured in accordance with ASTM Standard D1646-07 at 121° C., large rotor, condition ML 1+10 minutes. Thus, in certain possibly preferred embodiments, the Mooney viscosity of the fluoropolymer is about 25 to about 80, about 25 to about 70, about 25 to about 60, about 25 to about 50, or about 25 to about 40 (e.g., about 28 to about 38), as measured in accordance with ASTM Standard D1646-07 at 121° C., large rotor, condition ML 1+10 minutes.

The fluoropolymers suitable for use in the polymer composition include multimodal fluoropolymers. As utilized herein, the term "multimodal" is used to refer to a fluoropolymer that has at least two components of discrete and different molecular weights (e.g., discrete and different average molecular weights). Suitable multimodal fluoropolymer are described, for example, in International Patent Application Publication No. WO 2000/69967. In such multimodal fluoropolymers, each of the components may be amorphous or semi-crystalline, or one component may be amorphous and another component semi-crystalline.

The fluoropolymer can be present in the polymer composition of the invention in any suitable amount. In order to avoid or reduce deleterious effects on the optical properties of articles produced using the polymer composition of the invention, the inventors have found that the fluoropolymer typically should be present in the polymer composition in an amount that is relatively low. In certain possibly preferred embodiments, the fluoropolymer is present in the polymer composition in an amount of about 1,000 ppm or less, about 750 ppm or less, about 500 ppm or less, or about 250 ppm or less (e.g., about 200 ppm or less), based on the total weight of the polymer composition. In certain possibly preferred embodiments, the fluoropolymer can be present in the polymer composition in an amount such that the ratio of the amount of polymer additive present in the polymer composition to the amount of fluoropolymer present in the polymer composition is from about 4:1 to about 100:1, about 8:1 to about 100:1, about 10:1 to about 100:1, or about 20:1 to about 100:1, based on the total weight of the polymer additive and the fluoropolymer present in the polymer composition.

Many commercially-available fluoropolymers sold as polymer processing aids contain small amounts of at least one interfacial agent, such as a polyalkylene oxide (e.g., poly (ethylene glycol) or poly(ethylene oxide)), which is thought to improve the performance of the polymer processing aid by wetting the surface of the fluoropolymer particles in the polymer processing aid. However, despite the benefits typically associated with the use of interfacial agents, such as poly (ethylene glycol), it is believed that such interfacial agents can actually detract from the favorable optical properties of a molded article produced using a polymer composition of the invention. Accordingly, in certain possibly preferred embodiments, the polymer composition of the invention is substantially free of poly(ethylene glycol) or substantially free of any interfacial agent. More specifically, in certain possibly preferred embodiments, the polymer composition contains less than 100 ppm of poly(ethylene glycol), less than 50 ppm of poly(ethylene glycol), less than 25 ppm of poly(ethylene glycol), less than 10 ppm of poly(ethylene glycol), or less than 5 ppm of poly(ethylene glycol).

As noted above, the invention also provides a molded thermoplastic article comprising at least one wall defining a cavity, the wall having an opening therein permitting access to the cavity. The wall is formed from a polymer composition that comprises a polymer, a polymer additive selected from the group consisting of nucleating agents, clarifying agents, and combinations thereof, and a fluoropolymer, such as the polymer composition described above.

As noted above, the polymer composition of the invention is believed to be particularly well-suited for use in producing molded articles exhibiting desirable optical properties, such as high gloss (both inside gloss and outside gloss) and low haze. In particular, it is believed that molded articles produced using the polymer composition of the invention can exhibit gloss values that are 5, 10, 15, or even 20 gloss units higher than a molded article produced using a comparable polymer composition that does not contain each of the components described in the present application, when the gloss of the molded article is measured in accordance with ASTM Standard D523 at an angle of 60°.

The molded thermoplastic article of the invention can be formed by any suitable method. However, the polymer composition of the invention is believed to be particularly well-suited for use in extrusion blow molding processes. Thus, in a third embodiment, the invention provides a method generally comprising the steps of providing an apparatus comprising a die and a mold cavity, providing a polymer composition, heating the polymer composition to a temperature sufficient to plasticize (melt) the polymer composition so that it may be extruded through the die of the apparatus, extruding the plasticized (molten) polymer composition through the die to form a parison, capturing the parison in the mold cavity, blowing a pressurized fluid into the parison under sufficient pressure to inflate the parison so that it conforms to the interior surface of the mold cavity and produces a molded article, allowing the molded article to cool to a temperature at which the polymer composition at least partially solidifies so that the molded article retains its shape, and removing the molded article from the mold cavity. The polymer composition used in the method comprises a polymer, a polymer additive selected from the group consisting of nucleating agents, clarifying agents, and combinations thereof, and a fluoropolymer, such as the polymer composition described above.

The apparatus used in practicing the method of the invention can by any suitable extrusion blow molding apparatus. Suitable extrusion blow molding apparatus include continuous extrusion blow molding apparatus, such as rotary wheel extrusion blow molding apparatus and shuttle extrusion blow molding apparatus, and intermittent extrusion blow molding apparatus, such as reciprocating screw extrusion blow molding apparatus and accumulator head extrusion blow molding apparatus. As noted above, the apparatus includes a die through which the plasticized (molten) polymer composition is extruded to form a parison. The apparatus also includes a mold having a mold cavity. The mold cavity or the interior surfaces of the mold cavity defines the shape of the molded article to be produced by the apparatus. More specifically, the interior surfaces of the mold cavity define the exterior surfaces of the molded article produced by the apparatus.

In certain possibly preferred embodiments, the apparatus used in the practice of the method can first be prepped for the production of molded articles by running a polymer composition containing a fluoropolymer (e.g., a masterbatch containing a fluoropolymer) through the working surfaces of the apparatus, such as the die and mold. More specifically, if a masterbatch is used, the masterbatch is let-down into a carrier polymer, mixed, and the resulting mixture is run through the apparatus. Typically, the masterbatch is let-down into the carrier polymer at a ratio or rate that produces a mixture containing an amount of fluoropolymer that is greater than the amount of fluoropolymer that is present in the polymer composition used to produce the molded articles. While not wishing to be bound to any particular theory, it is believed that running this mixture, which contains a relatively high amount of fluoropolymer, through the apparatus helps to thoroughly coat the working surfaces of the apparatus with the fluoropolymer. It is also believed that this coating, at least in part, helps to improve the optical properties of the molded article by eliminating or at least reducing imperfections in the molded article caused by imperfections or irregularities in the working surfaces (e.g., die and mold cavity) of the apparatus. The fluoropolymer and carrier polymer used in the above-described procedure can be any suitable fluoropolymer and carrier polymer, such as the fluoropolymers and thermoplastic polymers described above. Furthermore, the fluoropolymer and carrier polymer can be the same as those contained in the polymer composition used to produce the molded articles, or the fluoropolymer and/or the carrier polymer can be different from those contained in the polymer composition used to produce the molded articles.

When used prior to the production of molded articles in accordance with the method of the invention, the polymer composition described in the preceding paragraph (e.g., masterbatch composition) can be run through the apparatus for any suitable amount of time. Typically, the composition (e.g., masterbatch composition) is run through the apparatus for an amount of time sufficient to work the composition (e.g., masterbatch composition) through the internal portions of the apparatus (e.g., extruder screw) and begin to coat the working surfaces of the apparatus (e.g., about 5 minutes or more, about 10 minutes or more, or about 15 minutes or more). After the composition (e.g., masterbatch composition) has been run through the apparatus for the desired length of time, the apparatus can be disassembled so that any char and/or molten polymer can be removed from the working surfaces of the apparatus (e.g., the die). After these surfaces have been cleaned, the apparatus can be reassembled, and the composition (e.g., masterbatch and carrier polymer mixture) can be run through the apparatus for an additional time, if desired (e.g., an additional 60 minutes or more). Once the desired amount of the composition (e.g., masterbatch and carrier polymer mixture) have been run though the apparatus, the apparatus can be purged by running a carrier polymer (i.e., carrier polymer without masterbatch) through the apparatus for an amount of time sufficient to purge the masterbatch and carrier polymer mixture from the apparatus (e.g., about 15 minutes or more). The carrier polymer used in this purging step typically is the same as the carrier polymer mixed with the masterbatch composition, but it is not necessary or required that they be the same.

If the above-described preparation procedure is followed, the polymer composition comprising the polymer additive and fluoropolymer is fed into the apparatus once the apparatus has been purged for the desired amount of time. As will be understood by those of ordinary skill in the art, the step of heating the polymer composition to a temperature sufficient to plasticize (melt) the composition typically is achieved, at least in part, by the friction generated by the extruder screw used to feed the polymer composition to the die of the apparatus. This frictional heating typically is supplemented using heaters, which allows the polymer composition to be heated under more controlled conditions and to a temperature at which the polymer composition is more easily extruded through the die.

Once the polymer composition has been heated to the temperature, the polymer composition is extruded through the die of the apparatus to form a parison. The resulting parison is then captured in the mold cavity of the apparatus. The mold typically contains a single opening that allows access to the mold cavity. The parison is captured in the mold in such a way that the open end of the parison is aligned with the opening in the mold. Once the parison has been captured in the mold, a pressurized fluid (e.g., air) is blown into the parison under sufficient pressure to inflate the parison so that it conforms to the interior surface of the mold cavity and forms the desired molded article. Once the parison has been blown to form the desired molded article, the article is held in the mold for an amount of time sufficient for the polymer to solidify to such a degree that the article maintains its shape when removed from the mold. The mold of the apparatus typically is cooled so that this cooling can be more rapidly achieved and the cycle time lowered.

The following examples further illustrate the subject matter described above but, of course, should not be construed as in any way limiting the scope thereof.

EXAMPLE 1

This example demonstrates a method for producing a thermoplastic article in accordance with the invention. Nine fourteen-kilogram batches of polypropylene random copolymer compositions (Samples 1A-1I) were compounded in accordance with the formulations set forth in Table 1 and Table 2 below. Sample 1 was made using Millad® NX8000 clarifying agent, which is an acetal compound conforming to the structure of Formula (I) in which $R_1$, $R_4$, and $R_9$ are each n-propyl groups, $R_2$, $R_3$, $R_5$, $R_6$, $R_7$, $R_8$, $R_{10}$, and $R_{11}$ are each hydrogen, and $R_{12}$ is —CHOHCH$_2$OH, and/or a fluoropolymer polymer processing aid. Twenty kilograms of a fluoropolymer masterbatch was made in accordance with the formulation set forth in Table 3.

The fluoropolymer used in this example is Dynamar™ FX5911 polymer processing additive from 3M. The fluoropolymer is believed to be a terpolymer of vinylidene fluoride, tetrafluoroethylene, and hexafluoropropylene, which exhibits a Melt Flow Index of approximately 10.8 g/10 minutes as measured in accordance with ASTM D1238-04c at 265° C. using a 5 kg weight. Dynamar™ FX5911 is also believed to be substantially free of interfacial agents.

TABLE 1

Formulation for Sample 1A.

| Component | Amount |
|---|---|
| Polypropylene random copolymer | 7000.0 g |
| Acid Scavenger (Calcium Stearate) | 5.6 g |
| Secondary Antioxidant (Irgafos ® 168) | 7 g |
| Fluoropolymer (Dynamar™ FX5911) | 1.4 g |

TABLE 2

Formulation for Samples 1B-1I.

| | Component | Amount |
|---|---|---|
| | Polypropylene random copolymer | 7000.0 g |
| | Acid Scavenger (Calcium Stearate) | 5.6 g |
| | Secondary Antioxidant (Irgafos ® 168) | 7 g |
| | Millad ® NX8000 | 28 g |
| Fluoropolymer (Dynamar™ FX5911) | 1B | 0 |
| | 1C | 0.7 g |
| | 1D | 1.4 g |
| | 1E | 2.1 g |
| | 1F | 2.8 g |
| | 1G | 3.5 g |
| | 1H | 5.25 g |
| | 1I | 7.0 g |

TABLE 3

Formulation for Masterbatch 1.

| Component | Amount |
|---|---|
| Polypropylene random copolymer | 5000.0 g |
| Acid Scavenger (Calcium Stearate) | 4.0 g |
| Primary Antioxidant (Irganox ® 1010) | 2.5 g |
| Secondary Antioxidant (Irgafos ® 168) | 5 g |
| Fluoropolymer (Dynamar™ FX5911) | 100 g |

Each of the polypropylene random copolymer compositions were compounded by blending the components in a Henschel high intensity mixer for an estimated time of 2 minutes at blade speed of approximately 2100 rpm. The samples were then melt compounded on MPM single screw compounding extruder with a 40 mm screw diameter and length/diameter ratio of 24:1. The barrel temperature of the extruder was from approximately 400° F. to approximately 455° F., and the screw speed was set at approximately 15% motor load. The extrudate (in the form a strand) for each sample was cooled in a water bath and subsequently pelletized.

The fluoropolymer masterbatch (Masterbatch 1) was compounded by blending the components in a Henschel high intensity mixer for an estimated time of 2 minutes at a blade speed of approximately 2100 rpm. The samples were then melt compounded on a Deltaplast single screw compounding extruder with a 25 mm screw diameter and length/diameter ratio of 30:1. The barrel temperature of the extruder was from approximately 400° F. to approximately 455° F., and the screw speed was set at approximately 100 rpm. The extrudate (in the form a strand) for the masterbatch was cooled in a water bath and subsequently pelletized.

For the bottles produced using Samples 1A, 1C, 1D, 1E, 1F, 1G, 1H, and 1I, a fluoropolymer coating was applied to the blow-molding apparatus prior to the production of bottles. The fluoropolymer coating was applied by feeding a blend of Masterbatch 1 and random copolymer to the Bekum H-121S single-station extrusion blow-molding machine and extruded for approximately ten minutes. The blend was made by adding Masterbatch 1 at 15% use rate into random copolymer polypropylene using a Macquire W-140Rm1 blending system. The machine head tooling was removed and cleaned of molten polymer and char. The machine head tooling was reassembled onto the head. The extruder die gap was set at a 5% to closed position and extruder rpm was set approximately 60 rpm. The blend of Masterbatch 1 and polypropylene random copolymer was then extruded at the conditions above for approximately one additional hour. The extruder was then purged for approximately fifteen minutes with pure polypropylene random copolymer at a die gap setting of 30% and screw speed at approximately 30 rpm.

Following the preparation sequence as noted above, each of the polypropylene random copolymer compositions was used to produce 500 mL bottles on a Bekum H-121S single-station extrusion blow-molding machine. The blow-molding machine had a 50 mm screw diameter, a length/diameter ratio of 24:1, and a smooth barrel. The barrel temperature was approximately starting at 360° F. and ending at 380° F., with the extrusion head maintained at a temperature of approximately 380° F. The molten polymer parison was extruded at a 400° F. melt temperature into a blow mold that was maintained at mold temperature of approximately 65° F. The final polypropylene bottle weighed approximately 32 grams and measured 33 mils in thickness. The bottles produced were then tested as described below.

The percent haze for the side wall of the bottles was measured in accordance with ASTM Standard D1103-92 using a BYK-Gardner Haze-Guard Plus. The gloss of both the inside and outside of the bottle side wall was measured in accordance with ASTM Standard D523 using a BYK-Gardner micro-TRI-gloss 4520 at an angle of 60°. The measured percent haze and gloss values for the bottles are set forth in Table 4 below.

TABLE 4

Optical Properties of bottles made from Samples 1A-1I.

| Sample | Haze (%) | Inside Gloss (%) | Outside Gloss (%) |
| --- | --- | --- | --- |
| 1A | 51.2 | 35.1 | 89.7 |
| 1B | 9.5 | 97.2 | 85.3 |
| 1C | 10.0 | 109.8 | 107.8 |
| 1D | 14.2 | 105.0 | 101.5 |
| 1E | 17.3 | 102.8 | 98.8 |
| 1F | 20.2 | 101.7 | 97.5 |
| 1G | 22.7 | 98.9 | 93.4 |
| 1H | 27.8 | 98.2 | 92.3 |
| 1I | 29.6 | 96.5 | 89.3 |

As can be seen from the data set forth in Table 4, polypropylene random copolymer compositions according to the invention (e.g., Samples 1C and 1D) produce extrusion blow molded bottles exhibiting a better, synergistic combination of high gloss and low haze than blow molded bottles produced using a different polymer composition, such as Sample 1A (fluoropolymer without clarifying agent) and Sample 1B (clarifying agent without fluoropolymer). Furthermore, while improvements in haze and gloss relative to Sample 1A are seen for all of the polymer compositions containing a combination of a fluoropolymer and a clarifying agent (i.e., Samples 1C-1I), the results suggest that the most marked improvement in both haze and gloss is achieved when the concentration of the fluoropolymer is below 300 ppm (e.g., 200 ppm or less).

EXAMPLE 2

This example demonstrates a method for producing a thermoplastic article in accordance with the invention. Four twenty-one kilogram batches of polypropylene random copolymer compositions (Samples 2A-2D) were compounded in accordance with the formulations set forth in Table 5. Sample 2 was made using NA-21 nucleating agent, Millad® 3988i clarifying agent, Millad® NX8000 clarifying agent, and Hyperform® HPN-20E nucleating agent. The fluoropolymer was added to each of the compounded polypropylene random copolymer compositions by adding Masterbatch 1 (from Example 1).

TABLE 5

Formulation for Samples 2A-2D

| Component | Amount |
| --- | --- |
| Polypropylene random copolymer | 7000.0 g |
| Acid Scavenger (Calcium Stearate) | 5.6 g |
| Secondary Antioxidant (Irgafos ® 168) | 7 g |
| 2A          NA-21 | 7 g |
| 2B          Millad ® 3988i | 14 g |
| 2C          Millad ® NX8000 | 14 g |
| 2D          Hyperform ® HPN-20E | 5.6 g |

Each of the polypropylene random copolymer compositions was compounded by blending the components in a Henschel high intensity mixer for an estimated time of 2 minutes at a blade speed of approximately 2100 rpm. The samples were then melt compounded on MPM single screw compounding extruder with a 40 mm screw diameter and length/diameter ratio of 24:1. The barrel temperature of the extruder was from approximately 400° F. to approximately 455° F., and the screw speed was set at approximately 15% motor load. The extrudate (in the form a strand) for each polypropylene random copolymer was cooled in a water bath and subsequently palletized.

Each of the polypropylene random copolymer compositions was used to produce 500 mL bottles on a Bekum H-121S single-station extrusion blow-molding machine without first coating the blow-molding apparatus with a fluoropolymer. The blow-molding machine had a 50 mm screw diameter, a length/diameter ratio of 24:1, and a smooth barrel. The barrel temperature was approximately starting at 360° F. and ending at 380° F. with the extrusion head was maintained at a temperature approximately 380° F. The molten polymer parison was extruded at a 400° F. melt temperature into blow mold that was maintained at mold temperature of approximately 65° F. The final polypropylene bottle weighed approximately 32 grams and measured 33 mils in thickness. The bottles produced were then tested as described below.

For a subsequent molding run, a PPA coating was applied to the machine using Masterbatch 1 (from Example 1) at a 15% use rate in random copolymer polypropylene using a Macquire W-140Rm1 blending system. The blend of PPA and random copolymer were fed to the Bekum H-121S single-station extrusion blow-molding machine and extruded for approximately ten minutes. The machine head tooling was removed and cleaned of molten polymer and char. The machine head tooling was reassembled onto the head. The extruder die gap was set at a 5% to closed position and extruder rpm was set approximately 60 rpm. The blend of PPA and polypropylene random copolymer was extruded at the conditions above for approximately one additional hour. The extruder was then purged for approximately fifteen minutes with pure polypropylene.

Each of the polypropylene random copolymer compositions was used to produce 500 mL bottles on a Bekum H-121S single-station extrusion blow-molding machine after application of the fluoropolymer coating as described above. Masterbatch 1 was added to each polypropylene random copolymer compositions using a Macquire W-140Rm1 blending system at a rate sufficient to achieve a 200 ppm fluoropolymer loading in the polymer composition. The blow-molding machine had a 50 mm screw diameter, a length/diameter ratio of 24:1, and a smooth barrel. The barrel temperature was approximately starting at 360° F. and ending at 380° F. with the extrusion head maintained at a temperature of approximately 380° F. The molten polymer parison was extruded at a 400° F. melt temperature into a blow mold that was maintained at a mold temperature of approximately 65° F. The final polypropylene bottle weighed approximately 32 grams and measured 33 mils in thickness. The bottles produced were then tested as described below.

The percent haze for the side wall of the bottles was measured in accordance with ASTM Standard D1103-92 using a BYK-Gardner Haze-Guard Plus. The gloss of both the inside and outside of the bottle side wall was measured in accordance with ASTM Standard D523 using a BYK-Gardner micro-TRI-gloss 4520 at an angle of 60°. The measured percent haze and gloss values for the bottles are set forth in Table 7 and Table 8 below.

TABLE 7

Optical Properties of bottles made from Samples 2A-2D without fluoropolymer coating of the blow-molding apparatus.

| Sample | Haze (%) | Inside Gloss (%) | Outside Gloss (%) |
|---|---|---|---|
| 2A | 23.3 | 80.6 | 78.3 |
| 2B | 18.2 | 93.9 | 88.0 |
| 2C | 13.8 | 99.9 | 88.2 |
| 2D | 30.7 | 95.6 | 87.8 |

TABLE 8

Optical Properties of bottles made from Samples 2A-2D with fluoropolymer coating of the blow-molding apparatus.

| Sample | Haze (%) | Inside Gloss (%) | Outside Gloss (%) |
|---|---|---|---|
| 2A | 27.0 | 102.3 | 99.4 |
| 2B | 27.1 | 99.3 | 93.8 |
| 2C | 22.7 | 104.5 | 102.6 |
| 2D | 35.1 | 98.5 | 96.7 |

As can be seen from a comparison of the data set forth in Tables 7 and 8, coating the blow-molding apparatus with fluoropolymer prior to the production of bottles significantly improves both the inside and outside gloss of the bottles. These results also demonstrate how improvements in both haze and gloss relative to a control (i.e., Sample 1A) can be achieved using a variety of different nucleating and/or clarifying agents.

EXAMPLE 3

This example demonstrates a method for producing a thermoplastic article in accordance with the invention. Three one and a half kilogram masterbatches of fluoropolymer polymer processing aids (PPA) in polypropylene random copolymer compositions (Samples 3A-3C) were compounded in accordance with the formulations set forth in Table 9. Sample 3A was made using DuPont Viton Z100 fluoropolymer polymer processing aid, which is believed to contain a fluoropolymer exhibiting a Melt Flow Index of approximately 1.2 g/10 minutes as measured in accordance with ASTM D1238-04c at 265° C. using a 5 kg weight. Sample 3B was made using DuPont Viton Z110 fluoropolymer polymer processing aid, and Sample 3C was made using Dynamar™ FX5929 fluoropolymer polymer processing aid. Each of these fluoropolymer polymer processing aids contains a fluoropolymer and approximately 50 wt. % poly(ethylene oxide) as an interfacial agent.

TABLE 9

Formulation for Samples 3A-C

| Component | | Amount |
|---|---|---|
| Polypropylene random copolymer | | 1459.05 g |
| Acid Scavenger (Calcium Stearate) | | 1.2 g |
| Primary Antioxidant (Irganox ® 1010) | | 0.75 g |
| Secondary Antioxidant (Irgafos ® 168) | | 1.5 g |
| 3A | DuPont Viton Z100 | 37.5 g |
| 3B | DuPont Viton Z110 | 37.5 g |
| 3C | Dynamar ™ FX5929 | 37.5 g |

Each PPA masterbatch was compounded by blending the components in a Henschel high intensity mixer for an estimated time of 2 minutes at blade speed of approximately 2100 rpm. The samples were then melt compounded on Deltaplast single screw compounding extruder with a 25 mm screw diameter and length/diameter ratio of 30:1. The barrel temperature of the extruder was from approximately 400° F. to approximately 455° F., and the screw speed was set a approximately 100 rpm. The extrudate (in the form a strand) for each polypropylene random copolymer was cooled in a water bath and subsequently pelletized.

Prior to using each masterbatch in the production of blow-molded articles, each PPA masterbatch was used to prep the blow-molding apparatus by adding the masterbatch at a 12% use rate into random copolymer polypropylene using a Macquire W-140Rm1 blending system. The blend of masterbatch and random copolymer was fed to the Bekum H-121S single-station extrusion blow-molding machine and extruded for approximately ten minutes. The machine head tooling was removed and cleaned of molten polymer and char. The machine head tooling was reassembled onto the head. The extruder die gap was set at a 5% to closed position and extruder rpm was set at approximately 60 rpm. The blend of PPA and polypropylene random copolymer was extruded at the conditions above for approximately one additional hour. The extruder was then purged for approximately fifteen minutes with pure polypropylene.

After the coating procedure described above, each masterbatch (Samples 3A-3C) was let down into a commercially-available 2 MFR random copolymer polypropylene clarified with Millad® NX8000 clarifying agent and used to produce 500 mL bottles on the extrusion blow-molding machine. The blow-molding machine had a 50 mm screw diameter, a length/diameter ratio of 24:1, and a smooth barrel. The barrel temperature was approximately starting at 360° F. and ending at 380° F. with the extrusion head maintained at a temperature of approximately 380° F. The molten polymer parison was extruded at a 400° F. melt temperature into a blow mold that was maintained at a mold temperature of approximately 65° F. The final polypropylene bottle weighed approximately 32 grams and measured 33 mils in thickness. The bottles produced were then tested as described below.

The percent haze for the side wall of the bottles was measured in accordance with ASTM Standard D1103-92 using a BYK-Gardner Haze-Guard Plus. The gloss of both the inside and outside of the bottle side wall was measured in accordance with ASTM Standard D523 using a BYK-Gardner micro-TRI-gloss 4520 at an angle of 60°. The measured percent haze and gloss values for the bottles are set forth in Table 10 below.

TABLE 10

Optical Properties of bottles made from Sample 3 after Coating with PPA

| Sample | Haze (%) | Inside Gloss (%) | Outside Gloss (%) |
|---|---|---|---|
| 3A | 14.9 | 88.0 | 64.5 |
| 3B | 17.7 | 90.1 | 66.7 |
| 3C | 15.6 | 89.3 | 75.0 |

As can be seen from the data set forth in Table 10, extrusion blow molded bottles made from the polymer compositions described in Example 3 exhibited improvements in both haze and inside gloss relative to Sample 1A, which contains only a fluoropolymer. However, these improvements were not as significant as those observed for compositions which did not contain an interfacial agent (e.g., Samples 1A-1I). Furthermore, the composition containing a fluoropolymer having a relatively low Melt Flow Index (e.g., Sample 3A) also did not show improvements as significant as those observed for compositions containing a fluoropolymer having relatively higher Melt Flow Index (e.g., Samples 1A-1I).

EXAMPLE 4

This example demonstrates a method for producing a thermoplastic article in accordance with the invention. Two one kilogram masterbatches of fluoropolymer PPA in polypropylene random copolymer compositions (Samples 4A and 4B) were compounded in accordance with the formulations set forth in Table 11. Sample 4A was made using Daikin 810X fluoropolymer polymer processing aid, and Sample 4B was made using Dynamar™ FX5920A fluoropolymer polymer processing aid. Each of these fluoropolymer polymer processing aids contains a fluoropolymer and approximately 65 wt. % poly(ethylene oxide) as an interfacial agent. Two fourteen kilogram batches of polypropylene random copolymer were compounded in accordance with the formulation set forth in Table 12.

TABLE 11

Formulation for 4A and 4B.

| Component | | Amount |
|---|---|---|
| Polypropylene random copolymer | | 990 g |
| Acid Scavenger (Calcium Stearate) | | 0.8 g |
| Primary Antioxidant (Irganox ® 1010) | | 0.5 g |
| Secondary Antioxidant (Irgafos ® 168) | | 1.0 g |
| 4A | Daikin 810X | 10 g |
| 4B | Dynamar ™ FX5920A | 10 g |

TABLE 12

Formulation for Polypropylene Random Copolymer.

| Component | Amount |
|---|---|
| Polypropylene random copolymer | 7000.0 g |
| Acid Scavenger (Calcium Stearate) | 5.6 g |
| Secondary Antioxidant (Irgafos ® 168) | 7 g |
| Millad ® NX8000 | 28.0 g |

Each fluoropolymer PPA masterbatch was compounded by blending the components in a Henschel high intensity mixer for an estimated time of 2 minutes at blade speed of approximately 2100 rpm. The samples were then melt compounded on a Deltaplast single screw compounding extruder with a 25 mm screw diameter and length/diameter ratio of 30:1. The barrel temperature of the extruder was from approximately 400° F. to approximately 455° F. and the screw speed was set at approximately 100 rpm. The extrudate (in the form a strand) for each masterbatch was cooled in a water bath and subsequently pelletized.

Prior to the production of bottles, the blow-molding machine was prepped by adding each fluoropolymer PPA masterbatch at a 30% use rate into random copolymer polypropylene using a Macquire W-140Rm1 blending system. The resulting blend of fluoropolymer PPA masterbatch and random copolymer were fed to the Bekum H-121S single-station extrusion blow-molding machine and extruded for approximately ten minutes. The machine head tooling was removed and cleaned of molten polymer and char. The machine head tooling was reassembled onto the head. The extruder die gap was set at a 5% to closed position and extruder rpm was set at approximately 60 rpm. The blend of PPA and polypropylene random copolymer was extruded at the conditions above for approximately one additional hour. The extruder was then purged for approximately fifteen minutes with pure polypropylene.

After the extrusion blow-molding machine was prepped as described above, each PPA masterbatch was combined with the polypropylene random copolymer composition from Table 12 and used to produce 500 mL bottles on a Bekum H-121S single-station extrusion blow-molding machine. The fluoropolymer PPA masterbatch was added to the polypropylene random copolymer using a Macquire W-140Rm1 blending system at a use rate sufficient to achieve a 200 ppm PPA loading in the polymer composition. The blow-molding machine had a 50 mm screw diameter, a length/diameter ratio of 24:1, and a smooth barrel. The barrel temperature was approximately starting at 360° F. and ending at 380° F. with the extrusion head maintained at a temperature of approximately 380° F. The molten polymer parison was extruded at a 400° F. melt temperature into a blow mold that was maintained at a mold temperature of approximately 65° F. The final polypropylene bottle weighed approximately 32 grams and measured 33 mils in thickness. The bottles produced were then tested as described below The percent haze for the side wall of the bottles was measured in accordance with ASTM Standard D1103-92 using a BYK-Gardner Haze-Guard Plus. The gloss of both the inside and outside of the bottle side wall was measured in accordance with ASTM Standard D523 using a BYK-Gardner micro-TRI-gloss 4520 at an angle of 60°. The measured percent haze and gloss values for the bottles are set forth in Table 13 below.

TABLE 13

Optical Properties of bottles made from Samples 4A and 4B.

| Sample | Haze (%) | Inside Gloss (%) | Outside Gloss (%) |
|---|---|---|---|
| 4A | 9.4 | 97.2 | 82.6 |
| 4B | 11.1 | 94.9 | 72.7 |

As can be seen from the data set forth in Table 13, extrusion blow molded bottles made from the polymer compositions described in this example exhibited improvements in both haze and gloss relative to bottles made from a polymer composition containing only a fluoropolymer (e.g., Sample 1A). However, these improvements were not as significant as those observed for compositions which did not contain an interfacial agent (e.g., Samples 1A-1I).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A polymer composition comprising:
   (a) a thermoplastic polymer;
   (b) a polymer additive selected from the group consisting of nucleating agents, clarifying agents, and combinations thereof; and
   (c) a fluoropolymer, the fluoropolymer having a Melt Flow Index of about 4 to about 30 g/10 minutes as measured in accordance with ASTM D1238-04c at 265° C. using a 5 kg weight,
   wherein the polymer additive and the fluoropolymer are present in the polymer composition in a ratio of polymer additive to fluoropolymer of 8:1 to about 100:1 based on the total weight of the polymer additive and the fluoropolymer present in the polymer composition.

2. The polymer composition of claim 1, wherein the thermoplastic polymer is a polyolefin.

3. The polymer composition of claim 2, wherein the thermoplastic polymer is selected from the group consisting of polypropylene homopolymers, polypropylene copolymers, and combinations thereof.

4. The polymer composition of claim 3, wherein the thermoplastic polymer is a polypropylene random copolymer.

5. The polymer composition of claim 1, wherein the polymer additive is a clarifying agent comprising an acetal compound conforming to the structure of Formula (I) below:

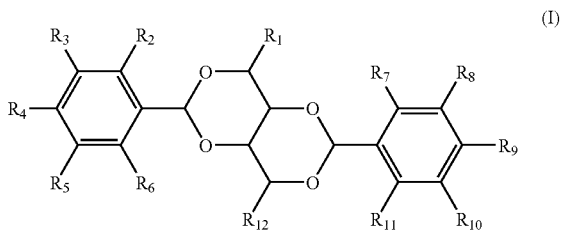

wherein $R_1$ is selected from the group consisting of hydrogen, alkyl groups, alkenyl groups, hydroxyalkyl groups, alkoxy groups, and alkyl halide groups; wherein $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens; and wherein $R_{12}$ is a hydroxyalkyl group selected from the group consisting of —$CH_2OH$ and —$CHOHCH_2OH$.

6. The polymer composition of claim 5, wherein $R_1$ is selected from the group consisting of alkyl groups and alkenyl groups; $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are selected from the group consisting of alkyl groups and alkoxy groups.

7. The polymer composition of claim 6, wherein $R_1$, $R_4$ and $R_9$ are n-propyl groups.

8. The polymer composition of claim 1, wherein the fluoropolymer is a polymer made from at least one monomer selected from the group consisting of vinylidene fluoride, hexafluoropropylene, chlorotrifluoroethylene, tetrafluoroethylene, perfluoro(alkyl vinyl ether), and combinations thereof.

9. The polymer composition of claim 8, wherein the fluoropolymer is a polymer selected from the group consisting of (i) copolymers of vinylidene fluoride and a comonomer selected from the group consisting of hexafluoropropylene, chlorotrifluoroethylene, 1-hydropentafluoropropylene, and 2-hydropentafluoropropylene; (ii) terpolymers of vinylidene fluoride, tetrafluoroethylene, and a comonomer selected from the group consisting hexafluoropropylene, 1-hydropentafluoropropylene, and 2-hydropentafluoropropylene; (iii) copolymers of tetrafluoroethylene and propylene; (iv) copolymers of tetrafluoroethylene, propylene, and vinylidene fluoride; and (v) combinations of two or more of (i)-(iv).

10. The polymer composition of claim 9, wherein the fluoropolymer is a terpolymer of vinylidene fluoride, tetrafluoroethylene, and hexafluoropropylene.

11. The polymer composition of claim 1, wherein the fluoropolymer is present in the polymer composition in an amount of about 200 ppm or less, based on the total weight of the polymer composition.

12. The polymer composition of claim 1, wherein the polymer composition is substantially free of interfacial agents.

* * * * *